Feb. 15, 1966  A. A. BRAMMERLO  3,235,762
STATOR FOR USE IN ALTERNATING CURRENT INDUCTION MOTORS
Filed May 2, 1962  3 Sheets-Sheet 1

Inventor:
Allen A. Brammerlo,
by John M. Stoudt
Attorney.

Inventor:
Allen A. Brammerlo,
by John M. Stoudt
Attorney.

United States Patent Office 3,235,762
Patented Feb. 15, 1966

3,235,762
STATOR FOR USE IN ALTERNATING CURRENT
INDUCTION MOTORS
Allen A. Brammerlo, Sycamore, Ill., assignor to General
Electric Company, a corporation of New York
Filed May 2, 1962, Ser. No. 191,982
10 Claims. (Cl. 310—185)

This invention relates generally to dynamoelectric machines, and more particularly to an improved stator construction especially suitable for use in alternating current split phase induction motors, such as small horsepower single phase motors.

For most appliance and other equpment applications involving a high volume production of units, furnace fans, blowers for air conditioners, washing machines, where hundreds of thousands of motors are required per year, split phase induction motors of the single phase type have been continuously employed largely due to the economy inherent in their manufacture. However, in view of the continuing change in performance requirements of these pieces of equipment and the space limitations for housing the motors, the operating characteristics and running performance of the motors are becoming critical.

Unfortunately, there has been a practical difficulty in providing enhanced performance of split phase induction motors while at the same time maintaining economy in their manufacture. For example, is an attempt to attain an electromagnetically perfectly balanced motor having the highest degree of performance under running or full load conditions for a given motor size, it is customary to utilize stators having distributed main and auxiliary or start windings, with the auxiliary windings being displaced 90 electrical degrees from the main winding in an effort to provide perfect phase relation between the windings. Further, the necessary phase displacement between the currents of the windings in split phase motors, e.g. resistant type, the auxiliary winding is wound with smaller size wire than that for the main winding so that it will include a higher electrical resistance to produce the phase displacement. Furthermore, the coils are conventionally arranged in the slots in a concentric relation, with the outermost coils containing the greatest number of wire turns and the innermost coils having the least number in an attempt to achieve as close to a sinusoidal wave form for the windings as possible.

Various approaches in stator construction have been suggested to take advantage of the foregoing desirable split phase winding relationships in an attempt to make optimum utilization of winding material and provide a motor having enhanced running characteristics without unduly increasing the cost of manufacture. To illustrate this, it has been proposed that the stator core include one or more of the following concepts: stator with uniform cross section areas; forming the winding slots with a uniform area throughout the core while varying the shape of the individual slots. In many cases, these stators include one or more slots having undesirable slot space factors as well as a lack of maximum material utilization despite claims made to the contrary by those following these approaches. A slot space factor in the range above 60% is normally considered to be unsatisfactory, since in that range it is difficult and expensive to position the coil wires in the slots, resulting largely from the effort and labor required for proper coil insertion to avoid wire damage. By slot space factor is meant the ratio of the slot area actually filled with windings compared with the available slot area for accommodating the windings, the ratio usually being expressed in percent. In addition, it is not uncommon for motors incorporating stators of the foregoing types to includes a deterioration in starting conditions while the attempt is made to obtain an increase in running output.

Consequently, it will be appreciated from the foregoing that it is extremely desirable that alternating current split phase induction motors be provided with improved stators which not only provide enhanced running performance for any given motor size while concurrently maintaining an economy in their mass production manufacture or even effecting a cost reduction in such manufacture, but do so without introducing a deterioration in starting performance.

Accordingly, it is a general object of the invention to provide an improved stator construction permitting optimum magnetic material utilization with an economy in its mass production manufacture.

Another and more specific object of the invention is the provision of an improved stator construction having magnetic yoke and teeth cross sections related to the lines of flux in each primary pole under running conditions.

It is another specific object of the invention to provide an improved stator especially suitable for use in a single phase split phase induction motor while at the same time effecting economy in material and winding costs without adversely affecting the performance of the motor.

In carrying out the objects in one form thereof, I provide an improved stator for use in an alternating current split phase induction type motor in which the stator includes a core of magnetic material formed with a yoke section and a plurality of angularly spaced apart teeth sections extending inwardly from the yoke section to form a number of slots and a rotor bore. A main winding comprised of at least two concentric groups of coils is arranged in the slots to form a number of primary running poles in which the coils of each concentric group span a differing number of teeth sections. Generally speaking, I relate the magnetic cross section regions of the yoke and teeth sections at preselected locations of each primary pole to the peak lines of flux, as determined by the direction of rotation, produced in those particular regions by the excited winding under normal running or operating conditions.

Preferably, in one form the narrowest or most restrictive magnetic regions of the yoke section directly over the slots progressively decrease in radial depth from a maximum at the extremities of the running pole to a minimum near the center of the poles. Conversely, the individual teeth sections, as measured at their narrowest regions, are of least width adjacent the running pole extremities. This construction not only permits the employment of a winding arrangment approaching that for an electromagnetically balanced motor, but in addition allows economy and ease of winding. Furthermore, my invention provides, among other features, an unusually effective utilization of the stator core magnetic material under running conditions to enhance the running performance without unnecessarily diminishing the starting characteristics of the motor while concurrently achieving a savings in material.

The subject matter which I regard as my invention is particularly pointed out and distinctly claimed in the concluding portion of this specification. My invention, itself, however, both as to its organization and method of operation, together with further objects and advantages thereof may best be understood by reference to the following description taken in connection with the accompanying drawings.

Figure 2:
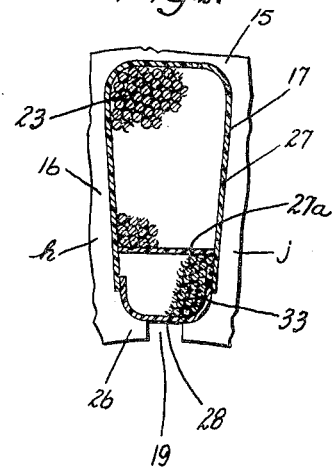
FIG. 2 is an enlarged fragmentary view of one of the winding accommodating slots of the stator shown in FIG. 1 to reveal the desirable slot space factor permitted by the present invention.

For purposes of explanation, my invention is illustrated as incorporated in a stator 10 of circular configuration, particularly suitable for use in an alternating current single phase resistance split phase reversible induction electric motor having a rotor with a standard skewed squirrel-cage secondary winding (not shown). The stator includes a core 11 built of a preselected number of laminations punched from relatively thin magnetic sheet material, the laminations being conventionally held together in juxtaposed relation by spaced apart keys 12 tightly received in complementing aligned notches 13 provided on the core periphery. Core 11 comprises a somewhat annular yoke section 15 and a plurality of spaced apart teeth sections 16 having generally parallel side walls, which project inwardly from the yoke section to define a number of winding slots 17 therebetween. The teeth sections each terminate in a tooth lip 26 which together form a rotor receiving bore 18. The illustrated stator is constructed with thirty-six slots, each having an entrance 19 defined between adjacent tooth lips 26 at bore 18, with the entrances equidistantly spaced around the bore. Further, as seen in FIG. 2, each slot is provided in the customary manner with a slot liner 27 of suitable insulating material along the slot walls and a slot entrance closing wedge 28.

The preferred embodiment of stator core 11, including the yoke and teeth sections constructed in accordance with the present invention, will be described in detail after I have outlined the winding arrangement employed by way of exemplification to disclose my novel stator construction.

Figure 1:
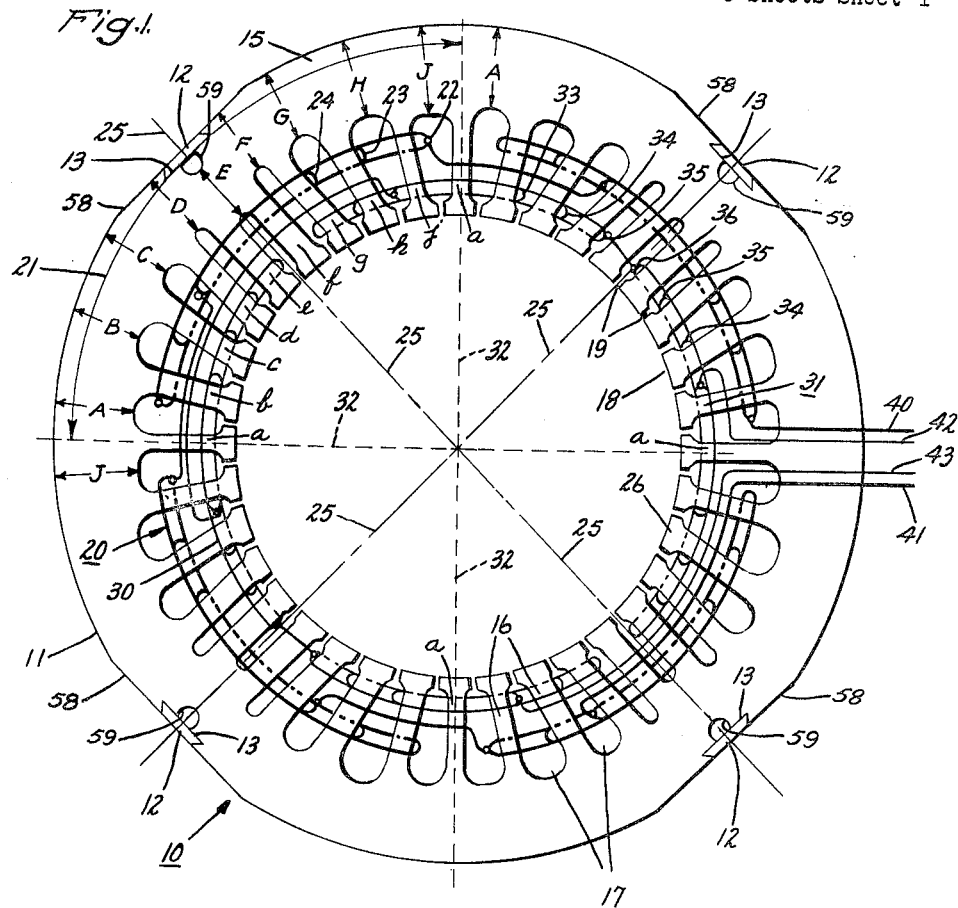
FIG. 1 is a front view of a stator adapted for reverse operation embodying one form of the present invention, with main and auxiliary windings being schematically illustrated on the stator forming a number of poles.
Figure 5:
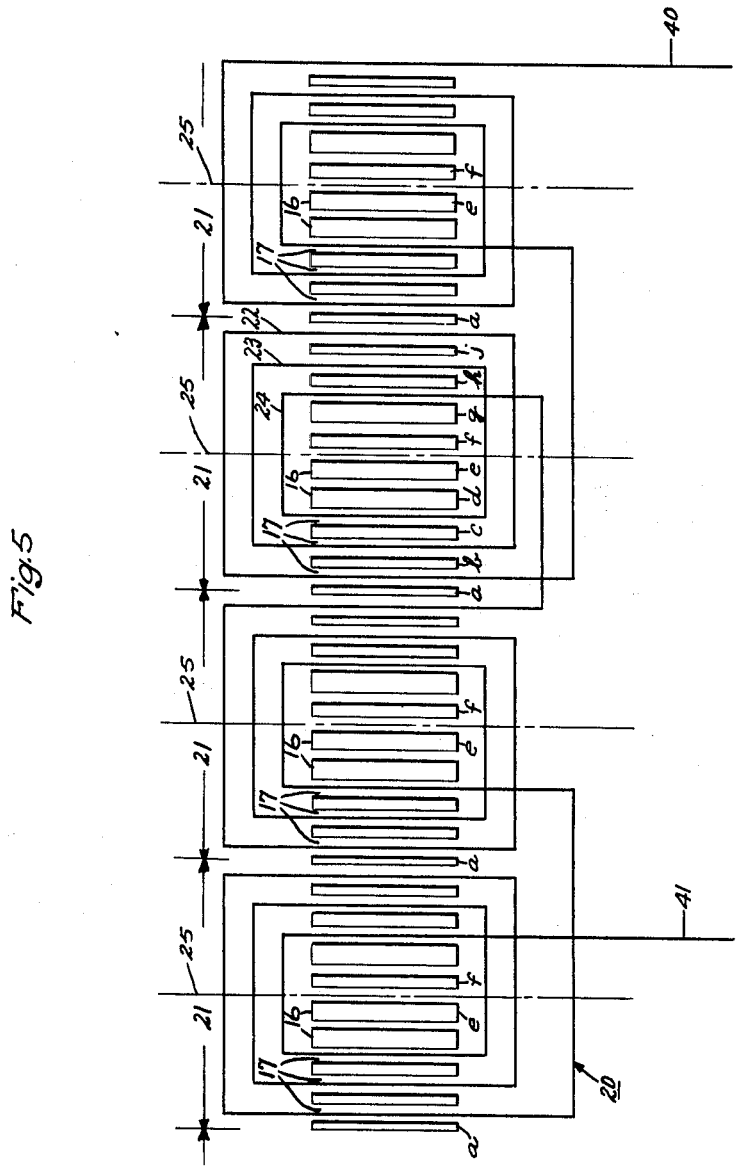
FIG. 5 is a developed polar diagram of the main winding and stator teeth sections shown in FIGURE 1.

More specifically, a multipolar main or field running winding 20 of the distributed wound type schematically illustrated in FIGURES 1 and 5 is arranged in winding slots 17 to provide four similar primary running poles 21, each pole being formed by three concentric coils 22, 23, and 24 symmetrically disposed about the radial center line 25 of the pole. Outermost coil 22 thus embraces teeth sections 16b, c, d, e, f, g, h, j (total of eight teeth) and is separated on each side from the outermost coil of the adjacent running pole by tooth section 16a. Intermediate concentric coil 23 accordingly spans six teeth sections, c–h inclusive, while innermost coil 24 is wound about the four teeth sections d, e, f, and g. In order to achieve as close to a sinusoidal flux wave form for the flux distribution as possible, preferably the coils include a differing number of turns of wire conductors, the precise number of turns being dependent upon the type and size of motor under consideration. An approximate sinusoidal wave form may be obtained by way of illustration, in a forty frame size motor incorporating a stator core having a 3½ inch diameter bore and a stack length of 1⅓ inches, by employing 0.0453 inch in diameter copper wire for coils 22, 23, and 24 respectively formed of thirty-four, thirty, and twenty-two turns of wire.

Still referring to FIG. 1 and the illustrated winding arrangement, an auxiliary or start winding 30, also formed into four distributed poles 31, is positioned in slots 17, with the radial center 32 of each pole disposed 90 electrical degrees from the main winding poles 21 and with each distributed pole arranged concentrically around tooth section 16a. As shown, two diametrical poles include three coils 33, 34, and 35, while the other two poles include a fourth coil 36. For attaining the approximate sine flux wave form and the necessary phase displacement between the currents in the respective windings, the start winding 30 should be wound with smaller size wire than that for winding 20. An example of the number of wire turns per coil in the forty frame motor mentioned above is as follows: twelve, eighteen, twenty-one, twenty-two turns of 0.0213 inch diameter wire respectively for coils 33–36 inclusive. Consequently, it will be appreciated from the foregoing that the winding arrangement described above includes the widely recognized and desirable relationships previously explained and will be used by me hereinafter to show the unusual attributes and advantageous features of a stator incorporating my invention in the preferred form.

It will be understood that any standard motor circuit well known to those skilled in the art is contemplated for energizing the windings to produce either clockwise (CW) or counterclockwise (CCW) operation, as desired. Therefore, the motor circuitry is neither illustrated nor described in detail. Suffice it to say that the main winding 20 may be suitably energized during starting and running conditions by connecting the winding to a single phase alternating current power source through leads 40 and 41. Starting winding 30 may be connected in parallel with winding 20 and energized during starting by leads 42 and 43. Reverse operation of the motor may be accomplished in the usual way, such as for instance by connecting leads 40 and 42 to one side of a supply line (not shown) and leads 41 and 43 to the other side, through the intermediary of a double pole double throw switch, to produce one direction of rotation (counterclockwise) may readily be obtained by reversing the polarity relation between windings 20 and 30, that is, by connecting leads 40 and 43 to one side of the line and leads 41 and 42 to the other side of the line. Once the motor has attained rated speed in either direction of rotation, the starting winding 30 may be suitably deenergized or open circuited by a standard speed responsive mechanism and switch (not shown).

Figure 3:
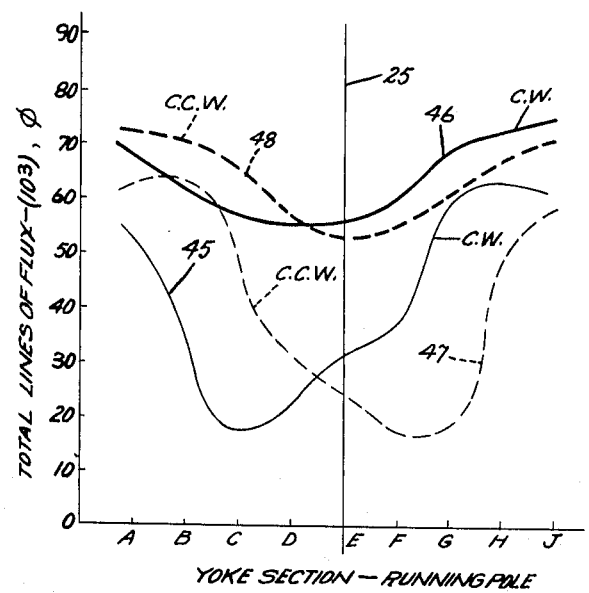
FIG. 3 is a graph illustrating a typical flux pattern expressed in lines of flux under starting and running conditions for both directions of rotation in preselected regions of the yoke section at each pole of the stator in FIG. 1.
Figure 4:
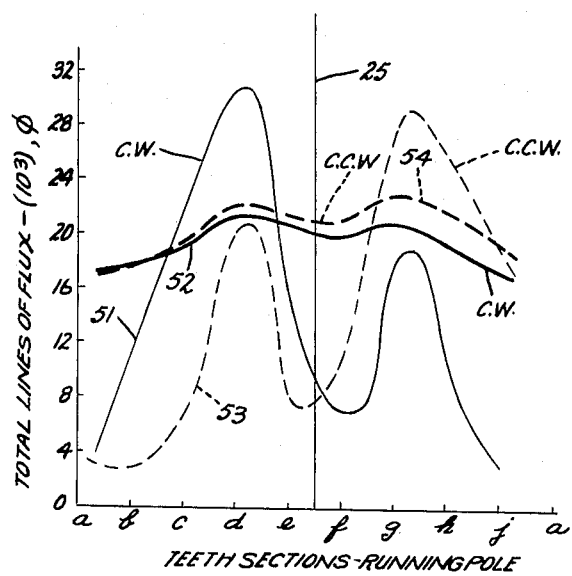
FIG. 4 is a graph similar to that of FIG. 3 under the same operating conditions revealing the lines of flux in the individual teeth sections of each pole.

Turning now to the preferred embodiment of my invention, and in particular to the graphs of FIGS. 3 and 4 taken in connection with the stator structure shown in FIG. 1, the graphs reveal flux patterns that the magnetic regions of each running pole 21 actually see or experience during starting and running conditions for both clockwise and counterclockwise operation. Since the flux carrying capacity of a particular magnetic region in core 11 is in effect controlled by the smallest cross sectional dimension of that region, these critical regions or magnetic radial depths of yoke section 15 in each running pole 21 are located directly over slots 17, between the upper slot walls and the peripheral surface of the core. For convenience of representation, I have used letters A, B, C, D, E, F, G, H, and J to denote these locations, progressing from A at one extremity of pole 21 to J at the other side, main winding coils 22, 23, and 24 being concentrically located relative to region E which is disposed at the radial center of the pole.

In actual practice total lines of flux $\phi$ in any given polar magnetic region of a core are ascertainable, by reference to the expression $$\phi = \frac{E \times 10^8}{4.44 Nf} \text{ lines}$$

where E represents the induced voltage as measured by a high impedance volt meter; the constant 4.44 relates to the sinusoidal wave form of the excited winding; N is the number of conductor turns in the search coil encompassing the magnetic region in question; and $f$ is the frequency in cycles per second of the winding excitation alternating current power source. Consequently, in this way total flux $\phi$ in yoke 15 at the designated lettered locations is easily measured.

With specific reference to FIG. 3 and the flux pattern produced by the windings in yoke section 15, curves 45 and 46 (solid lines) represent starting (at standstill) and running conditions respectively in the magnetic polar regions of yoke section 15 for clockwise (CW) operation of stator 10, while curves 47 and 48 (broken lines) illustrate total flux characteristics under similar circumstances for counterclockwise (CCW) rotation. It will be recalled that in the exemplification, windings 20 and 30 are both energized to start the motor, regardless of direction of rotation, with only main winding 20 excited when the motor attains normal operating speed; e.g. 1725 r.p.m.

In FIG. 4, the total lines of flux $\phi$ with reference to the teeth polar sections of running pole 21 are evidenced by curves (solid lines) 51 and 52 which show clockwise operation under standstill and running conditions. For reverse operation (CCW) curves 53 and 54 (broken lines) disclose the polar flux patterns under similar operating circumstances as that forming the bases for curves 51 and 52.

From the curves in FIGS. 3 and 4, it will be observed that the highest total lines of flux generated by the windings during initial start (curves 45, 47, 51, and 53) and normal run conditions (curves 46, 48, 52, and 54) is, generally speaking, at a peak in a particular magnetic polar region during normal run operation.

I further realize that in teeth sections $c$ and $d$ for CW rotation and $g$, $h$ for CCW rotation the total lines of flux are greater at standstill than at normal run operation; however, this state is transient in nature and exists only briefly, for no more than a few seconds, and as such does not cause undue sacrifice in the starting characteristics of the motor.

To illustrate more clearly how it is possible to obtain the optimum advantage of my invention when incorporated in a reversible motor having the concentric windings heretofore described, reference should be made to the peak lines of flux $\phi$ (curves 46 and 48 in FIG. 3 and 52 and 54 in FIG. 4) of the various magnetic regions at the running poles in core 11 which are set out in the following table

| Region of yoke section | A | B | C | D | E | F | G | H | J |
|---|---|---|---|---|---|---|---|---|---|
| Maximum total flux lines ($10^3$) $\phi$, running conditions | 73 | 71 | 68 | 59 | 57 | 62 | 68 | 72.5 | 75 |
| Direction of rotation providing max. $\phi$ | CCW | CCW | CCW | CCW | CW | CW | CW | CW | CW |

| Tooth section | $a$ | $b$ | $c$ | $d$ | $e$ | $f$ | $g$ | $h$ | $j$ |
|---|---|---|---|---|---|---|---|---|---|
| Maximum total flux lines ($10^3$) $\phi$, running conditions | 17.5 | 18.2 | 20 | 22.5 | 21 | 20 | 21.5 | 19 | 17.5 |
| Direction of rotation providing max. $\phi$ | CW | CW | CW CCW | CCW | CCW | CCW | CCW | CCW | CCW |

From the foregoing table it wil lbe recognized that the narrowest radial depth in the yoke regions directly over the individual slots 17 at each running pole should have the following approximate relationship with respect to region J, the yoke region with the highest total lines of flux (CW operation):

| Yoke region | A | B | C | D | E | F | G | H | J |
|---|---|---|---|---|---|---|---|---|---|
| Ratio of yoke regions to J | .97 | .95 | .91 | .79 | .76 | .83 | .91 | .96 | 1.00 |

By the same token, the narrowest cross section or width of the various teeth sections should be respectively related to the width of tooth section $d$ as follows:

| Tooth section | $a$ | $b$ | $c$ | $d$ | $e$ | $f$ | $g$ | $h$ | $j$ |
|---|---|---|---|---|---|---|---|---|---|
| Ratio of tooth section to $d$ | .78 | .81 | .89 | 1.00 | .93 | .89 | .96 | .85 | .78 |

In the preferred form of my invention, the magnetic regions of the polar sections of core 11 are determined by the direction of rotation which provides peak flux lines in these regions during normal run conditions, with the regions being proportionally related to such peak flux. It will be seen from FIG. 3 that the total flux $\phi$ in the yoke section (curves 46 and 48), gradually decreases from a maximum near each extremity of the running pole to a minimum adjacent center 25 of the pole, region E. Consequently, the yoke regions also progressively change in size in a manner akin to the change in peak flux. The peak flux $\phi$ in the teeth sections (FIG. 4) change across the running pole in a converse manner from that in the yoke sections. Accordingly, the teeth sections near the pole extremities will have a minimum cross section, that is, teeth $a$ and $b$. Technically, of course, tooth "$a$" is not within the confines of outermost coils 22 of the running poles and the flux passing through the tooth under running conditions results from the reactive feed back generated by the magnetic field of the rotor. However, for purposes of illustration, this tooth is considered to be a part of the running pole 21.

With this arrangement, as shown in FIGURES 1 and 5, the teeth sections on either side of the slots carrying the outermost coils 22 having the most turns of the distributed main windings are of less width than the teeth sections located on either side of the slots accommodating the innermost coils 24 having the least turns. Further, the radial depth of the magnetic regions in yoke section 15 gradually increase from a minimum near the radial center 25 of pole 21 to a maximum directly over outermost coils 22. With this relationship not only is excellent material utilization provided, but in addition winding slots are formed with sufficient winding accommodating area to receive the required number of conductors of the main winding for a satisfactory winding distribution; e.g., maximum slot space factors for the slots below the 60% maximum limit. FIG. 2 showing coils 23 and 33 in slot 17 with between-phase insulation 27a reveals this feature. Consequently, my invention provides unusually good material utilization and enhanced running performance.

With the least total flux being produced by the winding under running conditions in yoke section 15 in the vicinity of center 25 of each running pole 21, the generally circular peripheral surface of the laminated core may be conveniently formed with a chordal type edge 58 at that location to effect a savings in material as the individual laminations are severed or punched out from magnetic sheet stock. For instance, edge 58 may define a common cord between conterminous lamination blanks, which can be stamped out in a row aligned along center line 25, employing the well known progressive die punching system. Moreover, notches 13 for accommodating lamination securing keys 12 and suitable holes 59 for receiving bolts to mount stator 10 within a housing may readily be provided in the area near the center of the pole, adjacent chordal edge 58 without adversely affecting the magnetic characteristics of the core.

It will be appreciated, of course, that the most desirable dimensions and optimum relationships of the individual yoke regions and teeth sections will be governed by the flux saturation characteristics of the magnetic material used, the exact winding employed and the overall size of the motor. Moreover, the foregoing optimum yoke and teeth relationships may be varied while still retaining the benefits of my invention. Furthermore, while my improved stator construction has been shown as embodied in a stator wound for four pole operation, it should be appreciated from the foregoing by those skilled in the art that the principles of the invention are equally applicable to two pole constructions or in motors having more than four poles. Likewise, of course, the inventive concepts disclosed above may, if desired, be incorporated in stator cores having rectangular configurations as well as motors wound for two speed operation.

In summary, with use of my invention in a stator, not only is it possible to take full advantage of a winding arrangement approaching that for effecting an electromagnetically perfectly balanced motor but in addition, such is possible while retaining a maximum slot space factor for the slots under 60%, thereby realizing economy and ease of winding. Further economies in the manufacture of stators built in accordance with my invention result from a savings in material. In spite of the foregoing cost advantages, the running performance of a motor incorporating the invention may be enhanced without a sacrifice in the starting characteristics of the motor.

It should be apparent to those skilled in the art, which I have shown and described what at present is considered to be the preferred embodiment of my invention in accordance with the patent statutes, changes may be made in the structure disclosed without actually departing from the true spirit and scope of this invention, and I therefore intend to cover in the following claims all such equivalent variations as fall within the invention.

What I claim as new and desire to secure by Letters Patent of the United States is:

1. For use in a single phase alternating current split phase induction type motor, a stator having a core formed of magnetic material comprising a yoke section, a plurality of angularly spaced apart teeth sections extending inwardly from said yoke section and defining a number of winding slots therebetween, and a winding including at least two groups of coils each comprising turns of conductors arranged in some of said slots said coils spanning a preselected number of teeth sections and forming a number of primary running poles, the teeth sections on either side of the slots carrying the outermost conductors in each running pole being of less width than the teeth sections located on either side of the slots accommodating the innermost conductors of each running pole.

2. For use in a single phase alternating current split phase induction type motor, a stator having a core formed of magnetic material comprising a yoke section, a plurality of angularly spaced apart teeth sections extending inwardly from said yoke section and defining a number of winding slots therebetween, and a winding including at least two concentric groups of coils arranged in at least some of said slots forming a number of primary running poles, the coils in each group spanning differing numbers of teeth sections, the teeth sections on either side of the slots carrying the outermost coil in each of said running poles being less in width than the teeth sections positioned on either side of the slots accommodating the innermost coils of the same pole, and the magnetic region of the yoke section directly over outermost coil carrying slots in each of said running poles being larger in radial depth than the corresponding region above said innermost coil carrying slots in the same pole.

3. For use in alternating current induction type motor, a stator having a core formed of magnetic material comprising a yoke section, a plurality of angularly spaced apart teeth sections extending inwardly from said yoke section and defining a number of winding slots therebetween and a winding including at least two groups of coils arranged in predetermined slots, said coils spanning a preselected number of teeth sections to form a plurality of primary running poles, one tooth section positioned next to at least one of the predetermined slots near the extremities of each primary running pole being dimensionally less in width than the widths of the remaining teeth sections located next to the other predetermined slots in the same primary running pole, said preselected spanned teeth sections having the dimensionally greatest magnetic cross section in the respective polar regions which include the highest total lines of flux produced by said winding under running conditions.

4. For use in a single phase alternating current split phase reversely rotatable induction type motor, a stator having a core formed of magnetic material comprising a yoke section, a plurality of angularly spaced apart teeth sections extending inwardly from said yoke section to define a number of winding slots therebetween said teeth sections terminating in tooth lips together forming a rotor receiving bore, and a main winding including at least two concentric groups of coils arranged in said slots forming a number of primary running poles, an auxiliary winding electrically displaced in said slots from said main winding and having coil groups forming auxiliary poles, said windings adapted to be connected to provide reverse rotation, the coils in each pole group spanning a preselected number of teeth sections, said teeth and yoke sections having the greatest magnetic cross section in the respective polar regions in which the windings produce the highest total lines of flux under running conditions considering both directions of rotation.

5. For use in a single phase alternating current split phase induction type motor, a stator having a core formed of magnetic material comprising a yoke section, a plurality of angularly spaced apart teeth sections each having generally parallel sides extending inwardly from said yoke section to define a corresponding number of winding slots therebetween, and a distributed winding including at least two concentric groups of coils arranged in predetermined slots forming a number of primary running poles, the respective coils in each group spanning differing numbers of teeth sections, the most dimensionally restricted radial magnetic region of the yoke section directly over the predetermined slots accommodating the respective coils of each primary running pole progressively increasing in depth from the innermost coil to the outermost coil of the same pole.

6. For use in a single phase alternating current split phase induction type motor, a stator having a core formed of magnetic material comprising a yoke section, thirty-six angularly spaced apart teeth sections extending inwardly from said yoke section to define a corresponding number of winding slots therebetween, said teeth sections terminating in tooth lips defining a rotor receiving bore, a main winding adapted to be energized during starting and running conditions, said winding including four concentric groups of three coils each arranged in said slots forming four primary poles, an auxiliary winding electrically displaced in the slots from said main winding and adapted to be energized during starting, the coils in each main winding group spanning four, six and eight teeth sections respectively, the teeth sections on either side of the outermost coil in each primary pole being smaller in width than the teeth sections positioned on either side of the innermost coil of the same pole, and the smallest magnetic region of said yoke section directly above said outermost coil being of greater radial depth than the corresponding region above said innermost coil.

7. For use in a single phase alternating current split phase induction type motor, a stator having a core formed of magnetic material comprising a yoke section, a plurality of angularly spaced apart teeth sections extending inwardly from said yoke section and defining a number of winding slots therebetween, and a winding including at least two concentric groups of coils arranged in said slots, said coils forming a number of primary running poles having polar regions, the coils in each group spanning differing numbers of teeth sections, the teeth sections in each pole generally increasing in width from a minimum adjacent the outermost coils of any given running pole to a maximum width adjacent the innermost coils of the same pole, and the magnetic region of the yoke section directly over the coils of a given running pole progressively increasing in radial depth toward the pole extremities from a minimum dimension adjacent the radial center of said pole so that the teeth and yoke sections vary approximately in proportion to the total lines of flux produced by said winding under running conditions in the respective sections throughout each of said polar regions.

8. For use in a single phase alternating current split phase induction type motor; a stator comprising a core formed of magnetic material having a yoke section and a plurality of angularly spaced apart teeth sections extending inwardly from said yoke section to form a number of winding slots therebetween; and at least one distributed winding including a plurality of coils arranged in concentric coil groups in at least some of said slots to form a number of running poles when the winding is energized, each of said running poles spanning a number of teeth sections, at least one tooth section positioned next to the outermost coil disposed near the extremities of each running pole being dimensionally less in width, as measured at the narrowest portion of the individual tooth section disposed between adjacent slots, than the tooth section arranged on either side of the radial center of the same running pole.

9. For use in a single phase alternating current split phase induction type motor; a stator comprising a core formed of magnetic material having a yoke section and a plurality of angularly spaced apart teeth sections extending inwardly from said yoke section to form a number of winding slots therebetween; and at least one winding including a plurality of coils arranged in at least some of said slots to form a number of running poles when the winding is energized; each of said running poles spanning a number of teeth sections; the teeth sections in each running pole progressively increasing in width, as measured at the narrowest part of the individual tooth sections located between the sides of adjacent slots, from a minimum near the polar extremities to a maximum adjacent the center of the same pole.

10. For use in a single phase alternating current split phase induction type motor, a stator comprising a core formed of magnetic material having a yoke section and a plurality of angularly spaced apart teeth sections extending inwardly from said yoke section to form a number of winding slots therebetween, and at least one winding including an even number of concentric coil groups having the coils concentrically arranged in at least some of said slots, each of said concentric coil groups spanning a number of teeth sections to form a running pole when the winding is energized, the teeth sections disposed on either side of the slots at the pole extremities carrying the outermost coil in each concentric coil group being dimensionally less in width than the teeth sections disposed on either side of the radial center of the same pole.

References Cited by the Examiner
UNITED STATES PATENTS

| | | | |
|---|---|---|---|
| 1,723,912 | 8/1929 | Bergman | 310—176 |
| 2,761,082 | 8/1956 | Chang | 310—198 X |
| 2,795,712 | 6/1957 | Suhr | 310—198 |

ORIS L. RADER, *Primary Examiner.*

MILTON O. HIRSHFIELD, *Examiner.*